March 29, 1966  H. A. LINGARD ETAL  3,243,120
TRACK SECTION FOR MODEL VEHICLES
Filed Jan. 30, 1963  2 Sheets-Sheet 1
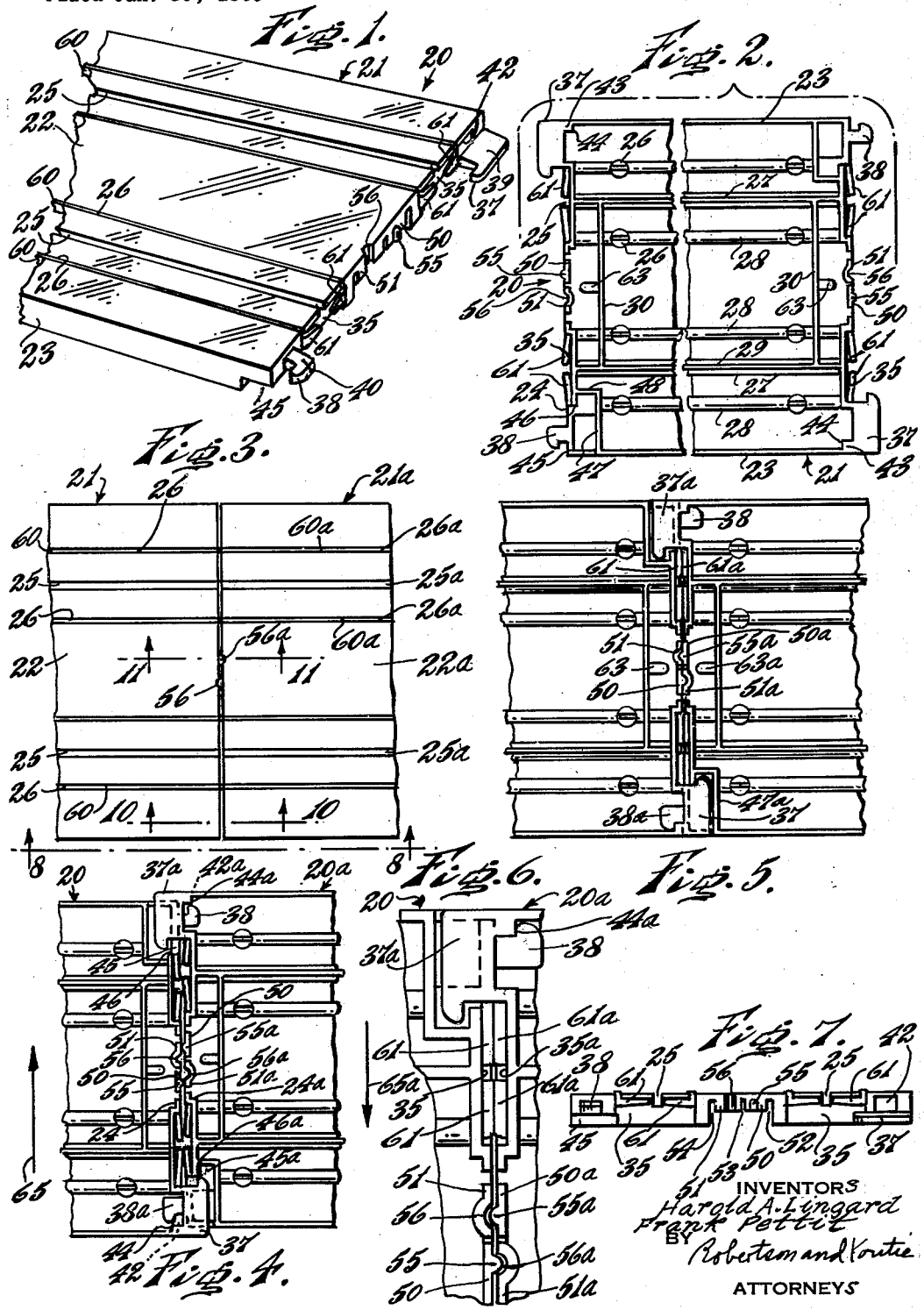
INVENTORS
Harold A. Lingard
Frank Pettit
BY
Robertson and Koutie
ATTORNEYS

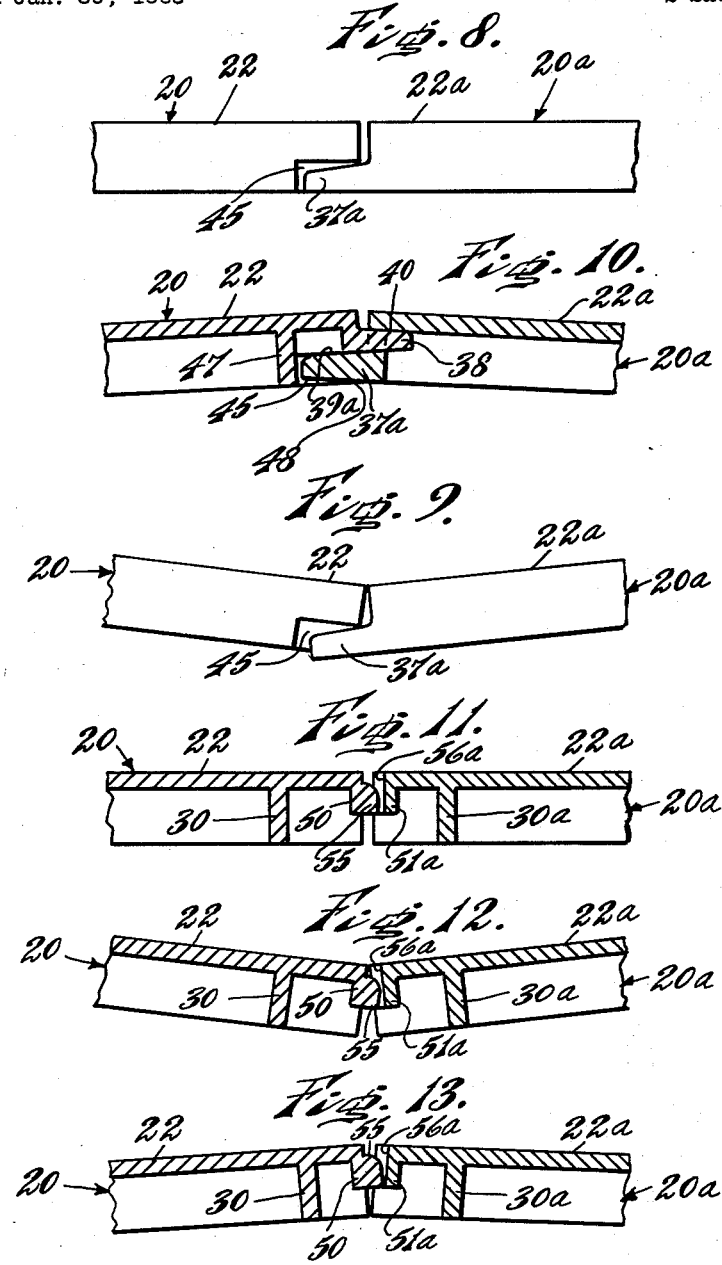

United States Patent Office 3,243,120
Patented Mar. 29, 1966

3,243,120
TRACK SECTION FOR MODEL VEHICLES
Harold A. Lingard, Merchantville, and Frank Pettit, Union, N.J., assignors to Mantua Metal Products Co., Inc., Rose Hill, Woodbury Heights, N.J., a corporation of New Jersey
Filed Jan. 30, 1963, Ser. No. 255,034
14 Claims. (Cl. 238—10)

This invention relates generally to model vehicles, and is especially concerned with a unique track construction therefor.

It is one object of the present invention to provide a track construction for model vehicles which is extremely versatile to accommodate to various layouts and operating conditions, quickly and easily connected to like track sections and disconnected therefrom to facilitate erection change and dismantling of a roadway layout, and which insures optimum vehicle operation under all conditions of use.

It is a more particular object of the present invention to provide a track construction for model vehicles wherein like sections are adapted for snap interengagement and disconnection adapted to be easily accomplished even by children, but which track sections cannot be inadvertently disconnected or separated even by rough handling when in use.

It is another specific object of the present invention to provide a track construction having the advantageous characteristics mentioned in the preceding paragraphs wherein adjacent, connected track sections are afforded limited relative angular movement so as to accommodate for out-of-level track support and permit of inclined track, wherever desired.

It is still a further object of the present invention to provide a track construction for model vehicles of the type described herein which is extremely simple in structure and use, entirely reliable and durable throughout a long useful life, and which can be economically mass-produced for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial perspective view showing a track section constructed in accordance with the teachings of the present invention;

FIGURE 2 is a bottom plan view showing a track section of the present invention and broken away to conserve drawing space;

FIGURE 3 is a top plan view partially illustrating a pair of track sections of the present invention connected together in end-to-end relationship;

FIGURE 4 is a bottom plan view showing a pair of track-section end portions in an intermediate stage of being connected;

FIGURE 5 is a bottom plan view showing track-section end portions in their connected relationship;

FIGURE 6 is a partial bottom plan view similar to FIGURE 5, but enlarged to show greater detail;

FIGURE 7 is an end view of a track section constructed in accordance with the teachings of the present invention;

FIGURE 8 is a side elevational view taken generally along the line 8—8 of FIGURE 3;

FIGURE 9 is a side elevational view similar to FIGURE 8, but illustrating the connected track section in a position of upwardly swung relative angular movement;

FIGURE 10 is a partial sectional view taken generally along the line 10—10 of FIGURE 3, but illustrating the track sections in a downwardly swung position of relatively angular movement;

FIGURE 11 is a partial sectional view taken generally along the line 11—11 of FIGURE 3;

FIGURE 12 is a sectional view similar to FIGURE 11 but showing the connected track sections in an upwardly swung position of relative angular movement; and FIGURE 13 is a sectional view similar to FIGURES 11 and 12, but showing the connected track sections in a position of relatively downwardly swung angular movement.

Referring now more particularly to the drawings, and specifically to FIGURES 1 and 2 thereof, a track section is there generally designated 20 and may include a generally flat body 21 which may be integrally fabricated of insulating material, such as by being molded of plastic. The body 21 may be of elongate, generally straight configuration, but may also be curved and of substantial width, to assume a desired shape. However, for simplicity of terminology the track section 20 and its body 21 will be considered of elongate configuration, having an elongate top wall 22, along opposite sides of which extend depending side walls 23, and at opposite ends of which depend end walls 24.

The top wall 22 of the body 21 may have its upper surface substantially flat and formed with one or more longitudinally extending, upwardly facing grooves, as at 25, which grooves open at their opposite ends through opposite end walls 24 of the body 21. Associated with each groove 25, there are formed in the top wall 22 a pair of grooves 26 extending longitudinally along and on opposite sides of each groove 25. The grooves 26 also open through opposite end walls 24 of the body 21. The grooves 25 are defined within depressed troughs 27 on the underside of body top wall 22, while each of the grooves 26 is defined within a depressed trough 28 on the underside of the body top wall. The troughs 27 may each be provided with a longitudinally extending, depending rib, as at 29 for rigidifying the body structure. Adjacent to and spaced inward from opposite end walls 24 there may be provided a pair of transverse reinforcing ribs 30, each extending laterally between the pair of reinforcing ribs 29.

Each end wall 24 is formed with an outwardly facing, laterally elongate recess 35 extending across each groove 25 to and terminating at opposite ends at the adjacent grooves 26. Each recess 35 opens into the end of a respective groove 25 and into the ends of adjacent grooves 26, opening downward through the lower edge of wall 24 and terminating spaced below the upper surface of top wall 22.

Opposite ends of the track section 20 may be substantially identical, so that a detailed description of one end will suffice. Projecting outward from each end wall 24, at laterally spaced locations, are a pair of hooks or hook-shaped catches 37 and 38. The hooks or catches 37 and 38 may be located adjacent to respective side walls 23, each being disposed generally horizontally and facing laterally in the same direction. Further, as best seen in FIGURE 2, the hooks 37 and 38 at opposite ends of the track section 20 face in laterally opposite directions. Thus, the pair of hooks 37 and 38 at each end of body 21 face laterally in the same direction, and in the opposite lateral direction as the hooks at the other body end. Each hook 37 may have its stem or shank portion connected to the respective wall 24 of a laterally greater or wider dimension than that of the hooks 38. While the hooks 37 and 38 are all generally flat and disposed substantially horizontally to face laterally, as described hereinbefore, it will be noted that the hooks 37 and 38 of each pair are vertically offset, so as to lie in different horizontal planes. More particularly, each hook 37 has its undersurface substantially flush with the lower edges of adjacent end wall 24 and side wall 23, and is considerably spaced below the upper surface of top wall 22. The other catch 38 is spaced considerably above the lower edge of the adjacent end wall 24 and side wall 23, being located adjacent to and spaced slightly below the upper surface of the top wall 22. Thus, the hooks or catches 37 and 38 may be considered as lying in lower and upper horizontal planes, respectively. While the hooks 37 and 38 are disposed generally horizontally, and their lower surfaces may be substantially horizontal, the upper surface 39 of the hook 37, and the upper surface 40 of the hook 38 may be inclined or slanted, so as to decline outward away from the adjacent end wall 24, for a purpose appearing presently. Thus, the hooks 37 and 38 taper outwardly when viewed in elevation, as seen in FIGURE 10.

Referring again to FIGURE 1, it will be seen that each end wall 24 is formed with a laterally extending through opening 42 located adjacent to the catch 37 and in the horizontal plane of catch 38. The opening 42 is located directly over the catch 37, being spaced from the adjacent side wall 23 by an end-wall portion 43 defining an inwardly facing shoulder 44, for a purpose appearing presently.

Adjacent to each catch 38, and directly therebelow, the adjacent end wall 24 is cut away to define an opening 45 therethrough. It will be observed that the opening 45 through the end wall 24 may extend laterally to open through the adjacent portion of side wall 23. On its laterally inner side, the opening 45 may be bounded by an edge 46 of the end wall 24; and, an internal wall may extend laterally inward, as at 47 from the adjacent side wall 23, and thence longitudinally to the end wall 24, as at 48. The wall portion 48 is spaced laterally inward from the bounding edge 46 of the end wall 24, for a purpose appearing presently.

The medial region of each end wall 24 is cut away to define thereof a pair of tongues or fingers 50 and 51 depending in side-by-side, spaced relation from the top wall 22 and terminating short of the lower edge of end wall 24. The tongues or fingers 50 and 51 may be considered as elements independent of the adjacent end wall 24, or as elements thereof defined by a plurality of laterally spaced downwardly opening slots 52, 53 and 54 formed in the end wall. The tongues or fingers 50 and 51 are thereby afforded a degree of resiliency independent of each other and of the adjacent, substantially coplanar end wall 24. As best seen in FIGURE 7, it may be observed that the tongues or fingers 50 and 51 depend to and terminate at generally horizontal, free edges medially spaced between the upper and lower edges of the end wall 24 and approximately coplanar with the underside of upper catch 38 and the upper side of lower catch 37.

Provided on the tongue 50 is a smoothly curved, outward protuberance or projection 55. The protuberance or projection 55 is spaced laterally between the slots 52 and 53, extending vertically upward from the lower edge of tongue 50 and terminating at a point spaced below the upper surface of top wall 22.

The finger or tongue 51 may be provided with an indentation or recess 56 spaced laterally between the slots 53 and 54. The recess 56 may extend vertically between and have its ends opening through the lower edge of tongue 51 and upper side of the top wall 22. In the illustrated embodiment, the slot 53 is shown as substantially along the longitudinal center line of the body 21. Also, the tongue 51 having recess 56 is on the side of tongue 50 with projection 55 toward which the hooks 37 and 38 face or open.

Seated in each of the grooves 26 is an elongate, conductor, strip or rail 60, which may have one edge projecting slightly beyond the upper surface of top wall 22 for conducting electricity to model vehicles moving along the top wall. At each end of each conductor or strip 60 there may be provided an extension or tab 61 bent inward toward the adjacent recess 35. That is, the tabs 61 of the conductors 60 on opposite sides of a groove 25 are bent inward toward each other to lie at least partially within the same recess 35 of end wall 24. The tabs 61 are advantageously possessed of at least a slight degree of resiliency, for a purpose appearing presently.

Depending from the underside of top wall 22, adjacent to and inward of each end wall 24, there is provided a lug or boss 63 for engagement with a supporting structure, such as a pier, pillar or the like.

As noted hereinbefore, the track section 20 has its opposite end structures substantially identical. Further, as will appear presently, a pair of such track sections have their opposite ends selectively interengageable with and detachable from each other. For example, in FIGURE 4 the track section 20, and a like track section 20a are in an initial stage of end-to-end connection, the track section 20a having numerals corresponding to those of the track section 20, but with the suffix "a". It will there be apparent that the like track sections 20 and 20a are in end-to-end relation, but slightly longitudinally offset for simultaneous insertion of catches 38 and 38a in openings 42a and 42, and catches 37 and 37a in openings 45a and 45. In the condition shown in FIGURE 4, the projection 55 bears against the tongue 51a, and the projection 55a bears against the tongue 51, so as to maintain the adjacent facing end walls 24 and 24a in substantially spaced relation. However, upon relative lateral movement of the track sections 20 and 20a in the directions of arrows 65 and 65a by simple hand pressure, the tongues 50, 51, 50a and 51a are thereby resiliently flexed for snap engagement of the catches 38 and 38a over the respective adjacent shoulders 44a and 44. The catches 37a and 37 simultaneously move past adjacent respective edges 46 and 46a, but this is a relatively loose relationship, while that of hooks 38 and 38a with shoulders 48a and 44 is a tighter engagement. At the same time, the projections 55 and 55a move laterally into recesses 56a and 56, respectively, to partially release the resilient flexure of the tongues 50, 51, 50a and 51a, while maintaining the track sections 20 and 20a in end-to-end, connected alignment, against inadvertent separation. The projections 55 and 55a, and receiving recesses 56a and 56 serve as releasable holding or detent means. However, it should be appreciated that the configuration of projections 55 and 55a and recesses 56 and 56a, and that of hooks 38 and 38a with the retaining shoulders 44a and 44, is such that the track sections 20 and 20a are firmly but detachably held together in aligned end-to-end relationship, but with slight spacing between the adjacent facing end walls 24 and 24a, as seen in FIGURES 3 and 5.

It will now be understood that the openings 42 and 42a define sockets for reception of catches 38a and 38, and that the shoulders 44 and 44a may be considered as internal undercuts for interengagement with the received catches. Similarly, the openings 45 and 45a define sockets for receiving the catches 37a and 37, with the wall edges 46 and 46a and the inner sides thereof defining undercuts or shoulders for interengagement with the received catches, as will appear presently.

In the generally coplanar condition of connected track sections 20 and 20a, as shown in FIGURES 3 and 8, the track sections are held together in their adjacent, end-to-end, slightly spaced relationship by interengagement of the catches 38 and 38a with respective shoulders or undercuts 44a and 44, and by interengagement of projections 55 and 55a and recesses 56a and 56. The interengaging projections, recesses, catches and shoulders all lie in substantially the same horizontal plane, being spaced considerably above the lower edges of walls 24 and 24a, and slightly spaced below the upper surfaces of top walls 22 and 22a. As the lower catches 37 and 37a only loosely receive the edge regions 46a and 46, the track sections 20 and 20a may swing upward relative to each other about a generally horizontal axis in the plane of the upper catches 38 and 38a. Such upward relative angular movement may be limited by engagement of the top walls 22 and 22a, as seen in FIGURE 9, and also by engagement of hooks 37 and 37a with their respective adjacent shoulder regions 46a and 46. This condition is shown in FIGURES 9 and 12.

Also, a degree of downward relative angular movement of connected track sections 20 and 20a is permitted by the outward declination of upper catch surfaces 39, 39a, 40 and 40a. This relative downward swinging movement of connected track sections may also be limited by abutting engagement of the lower edges of end walls 24 and 24a. These limiting conditions are shown in FIGURES 10 and 13.

Of course, in use the above-described relative angular movement between connected track sections permits of great simplicity and versatility, accommodating to many various arrangements and types of support. Notwithstanding the above-described relative angular movement between connected track sections, it will now be appreciated that continuous electrical connection is maintained between the rails 26 and 26a of connected track sections, the tabs 61 and 61a at all times remaining in electrically conducting contact.

While connection of track sections 20 and 20a has been described hereinbefore, it is appreciated that disconnection is equally easily accomplished by mere reversal of the direction of relative lateral movement of the connected track sections.

From the foregoing, it is seen that the instant invention provides a track construction for model vehicles which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A track section for model vehicles comprising an elongate generally flat body of insulating material, a pair of laterally spaced catches outstanding longitudinally from each end of said body, the catches of each pair facing laterally in the same direction and the catches at opposite body ends facing in opposite lateral directions, the catches of each pair being offset vertically to line in different planes, said body having a pair of laterally spaced sockets opening outward through each end of said body with the sockets of each pair offset vertically to receive a pair of catches of a like track section, said sockets each being adjacent to a respective catch and internally undercut in the direction opposite to the adjacent catch for interengagement with a received catch of a like track section upon lateral movement of the latter, and holding means on each end of said body for releasable interengagement with holding means of a like track section to resist said lateral movement.

2. A track section according to claim 1, in combination with a pair of conductors embedded in the upper side of said body for conducting electricity to a vehicle, and resilient tabs extending from said conductors beyond and overlying each end of said body for contact with tabs of a like track section, said tabs extending toward each other.

3. A track section according to claim 1, said body including a top wall, and end walls depending from opposite ends of said top wall, said catches outstanding from said end walls, and said sockets being defined by openings in said end walls.

4. A track section according to claim 1, said holding means comprising laterally spaced male and female elements on each end of said body, said male and female elements being located for movement into interfitting engagement with the male and female elements of a like track section upon said lateral movement thereof.

5. A track section for model vehicles comprising a body having a generally flat upper side, a pair of end walls extending laterally across opposite ends of said body and depending from the upper side thereof, a pair of relatively rigid laterally spaced hook-shaped catches projecting outward from each end wall, the catches of each pair facing laterally in the same direction and the catches at opposite body ends facing in opposite lateral directions, the catches of each pair being offset vertically to lie in different planes, said end walls each having a pair of laterally spaced vertically offset openings, the catches and opening of each end wall being interengageable with the catches and openings of a like track sections upon mutual insertion and relative lateral movement, and outwardly facing resilient holding means on each end wall for releasable interengagement with holding means of a like track section, to thereby detachably connect together in end-to-end relation a pair of said track sections.

6. A track section according to claim 5, said holding means projecting beyond the respective end wall to maintain slight spacing between adjacent end walls of like track sections having their catches and openings in mutual interengagement, to afford limited relative swinging movement about a horizontal axis between connected track sections.

7. A track section according to claim 6, said projecting holding means being spaced between the upper and lower edges of the respective end walls to facilitate said relative swinging movement.

8. A track section according to claim 6, said catches tapering outward, to facilitate said relative swinging movement.

9. A track section according to claim 6, said projecting holding means being spaced between the upper and lower edges of the respective end walls and being substantially horizontally coplanar with the upper catches of the respective end walls, the upper catches of each end wall being configured for relatively firm interengagement with the upper opening of a like track section, and the lower catch of each end wall being configured for relatively loose interengagement with the lower opening of a like track section, whereby a pair of interconnected track sections are swingable about a horizontal axis generally in the plane of said projecting detent means and upper catches.

10. A pair of track sections for a model vehicle, each track section comprising a body of insulating material having a generally flat upper side, an end wall at one end of each body extending laterally thereacross and depending from said upper side, a pair of laterally spaced hooks projecting outward from each end wall, the hooks of each pair facing laterally in the same direction and in the opposite direction as the hooks of the other pair when said bodies have their end walls in adjacent facing relation, the hooks of each pair being offset vertically to lie in different planes, said end walls each having a pair of laterally spaced vertically offset sockets to receive the hooks of the other end wall, said sockets being undercut for interengagement with the received hooks upon relative lateral movement of said end walls, and resilient interengageable holding means on said end walls for releasably holding said end walls against relative lateral movement.

11. A pair of track sections according to claim 10, said holding means projecting outward from each end wall to maintain slight spacing between adjacent facing end walls of said pair of track sections having their catches and sockets in mutual interengagement, to afford limited relative swinging movement about a horizontal axis between connected track sections.

12. A pair of track sections according to claim 10, said holding means comprising an outward projection on each of said end walls, and said end walls each being formed with a recess located to receive the projection of the other end wall when said hooks are interengaged with the receiving sockets.

13. A pair of track sections according to claim 12, said end walls being configured to provide depending resilient tongues carrying said projections and recesses for resilient snap engagement thereof.

14. A pair of track sections according to claim 13, said projections and recesses being configured to maintain said end walls slightly spaced in their connected relation and affording limited relative angular movement between connected track sections.

References Cited by the Examiner

UNITED STATES PATENTS

| 2,232,511 | 2/1941 | Caruso | 238—10 |
| 2,764,357 | 9/1956 | Katryniak | 238—10 |

FOREIGN PATENTS

| 675,541 | 12/1963 | Canada. |
| 1,246,030 | 10/1960 | France. |

OTHER REFERENCES

Bock et al.: German application 1,031,196 printed May 29, 1958 (Kl 77, 19/07).

ARTHUR L. LA POINT, *Primary Examiner.*

LEO QUACKENBUSH, *Examiner.*

M. J. HILL, R. A. BERTSCH, *Assistant Examiners.*